(No Model.)

M. E. HARRISON.
BEARING BRASS FOR CAR AXLE JOURNALS.

No. 345,232. Patented July 6, 1886.

Witnesses:
Josiah W. Ells
W. A. Bostwick

Inventor.
M. E. Harrison

UNITED STATES PATENT OFFICE.

MARTIN EMMITT HARRISON, OF PITTSBURG, PENNSYLVANIA.

BEARING-BRASS FOR CAR-AXLE JOURNALS.

SPECIFICATION forming part of Letters Patent No. 345,232, dated July 6, 1886.

Application filed October 23, 1885. Serial No. 180,776. (No model.)

*To all whom it may concern:*

Be it known that I, MARTIN EMMITT HARRISON, a citizen of the United States, residing at Pittsburg, in the county of Allegheny and State of Pennsylvania, have invented a new and useful Improvement in Bearing-Brasses for Journals of Car-Axles, of which the following is a specification.

It is a well-known source of trouble that car-axles and their bearing-brasses, when new, seldom conform to each other, and when first put in use much frictional heat is generated, endangering the safety of the parts. The want of proper fit also causes the journal to move irregularly upon its bearing, producing a sort of grinding process that speedily destroys both.

The object of my invention is to provide a bearing that will in a very short time conform to a journal in use therewith, and come to that exact and requisite degree of closeness as will enable the axle to move with a steady and uniform rotation, without grinding or undue friction, and to provide a bearing that will readily adapt itself to a journal of different radius or a journal of worn or uneven surface, and afford a means for a proper lubrication of the same.

The invention I have made will be clearly understood from the following description, taken in connection with the accompanying drawings, wherein—

Figure 1:
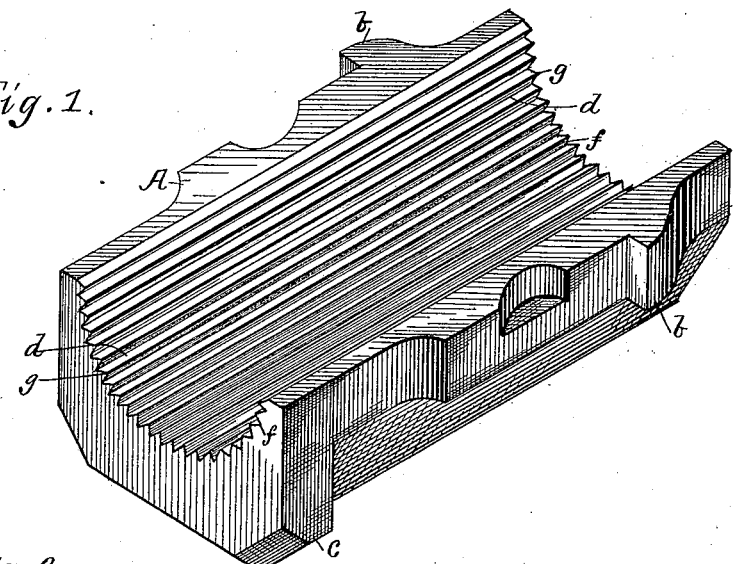
Figure 2:
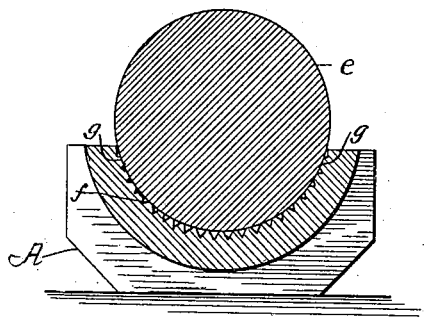
Figure 3:
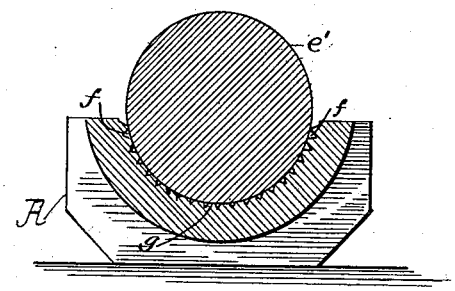
Figure 4:
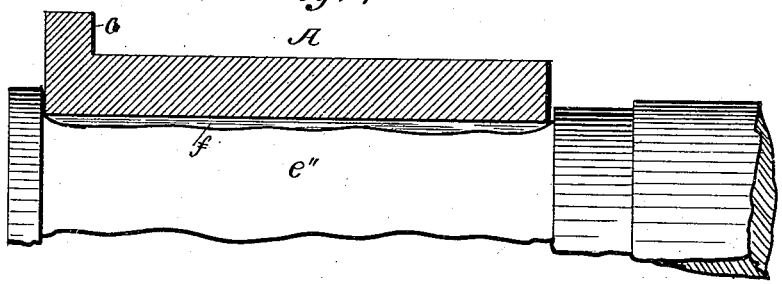

Figure 1 represents a perspective view of a railroad-car brass or bearing comprising the improvement I have made therein; Fig. 2, a vertical transverse section of a bearing and journal, the latter having a greater radius than the former, showing the effects of such construction on the bearing. Fig. 3 is a transverse section of a similar bearing and journal, the latter of less radius than the former, showing the peculiarity of wear resulting from such construction; Fig. 4, a longitudinal vertical section of a bearing and its journal, wherein the latter presents an uneven surface to the former, showing the manner in which the projections of the bearing conform themselves to the uneven surface of the axle, and form reservoirs along the same for a lubricating-fluid.

To put my invention into practice I construct a bearing, A, of brass or any suitable material, and form the same with an outwardly-projecting lug, $b$, on each side thereof, and with a flange, $c$, at or near one end, whereby the bearing is held in place and proper position within its axle-box. The concave surface $d$, intended for the journal $e$, is formed with a series of parallel grooves or depressions, $f$, and intervening projections or elevations, $g$, which I prefer shall be of an angular character and shape, extending the entire length of the bearing, and in a direction corresponding to the axis of the journal. As thus constructed and when in use with a journal, $e$, of greater radius, as illustrated in the drawings, Fig. 2, the projections $g$ near the top present a small surface to the journal, and readily wear away, allowing the same to find a substantial bearing in a very short time, the intervening grooves, $f$, being such as to prevent heating, by affording a ready passage-way for such oil as may be used to lubricate the parts. When this bearing A is used with a journal, $e'$, of less diameter, (see Fig. 3,) the projections $g$ at the bottom of the concave are first worn away, giving the journal a substantial bearing in that direction.

In a railroad-car axle the journal $e''$, after considerable wear or use, becomes uneven, as represented in the drawings, Fig. 4, and if used in connection with my improvement will readily find a solid bearing corresponding in form to the irregularities of the journal.

The projections $g$, when first brought in contact with a journal, will readily wear away, whereby the bearing and journal will soon be brought to a close fit, leaving a series of channels or grooved feeders for the proper application and supply of any suitable lubricating material.

I am aware that a journal composed of a hard outer portion and a soft yielding inner portion having a grooved surface is not new, and this I disclaim. Where a soft lining is used, it becomes flattened out, cut away, and is soon cut in two and displaced. My invention differs from this in making the box or bearing of one piece and forming the grooves directly in its inner surface.

Having thus described my invention, I claim—

As a new article of manufacture, a journal-bearing formed entirely of a single piece of metal, having integral therewith and along its concave surface a series of angular projecting ribs.

MARTIN EMMITT HARRISON.

Witnesses:
JOSIAH W. ELLS,
W. S. BOSTWICK.